(No Model.) 3 Sheets—Sheet 1.
J. S. DE PALOS.
PRICE AND QUANTITY REGISTER FOR GAS METERS.
No. 346,402. Patented July 27, 1886.
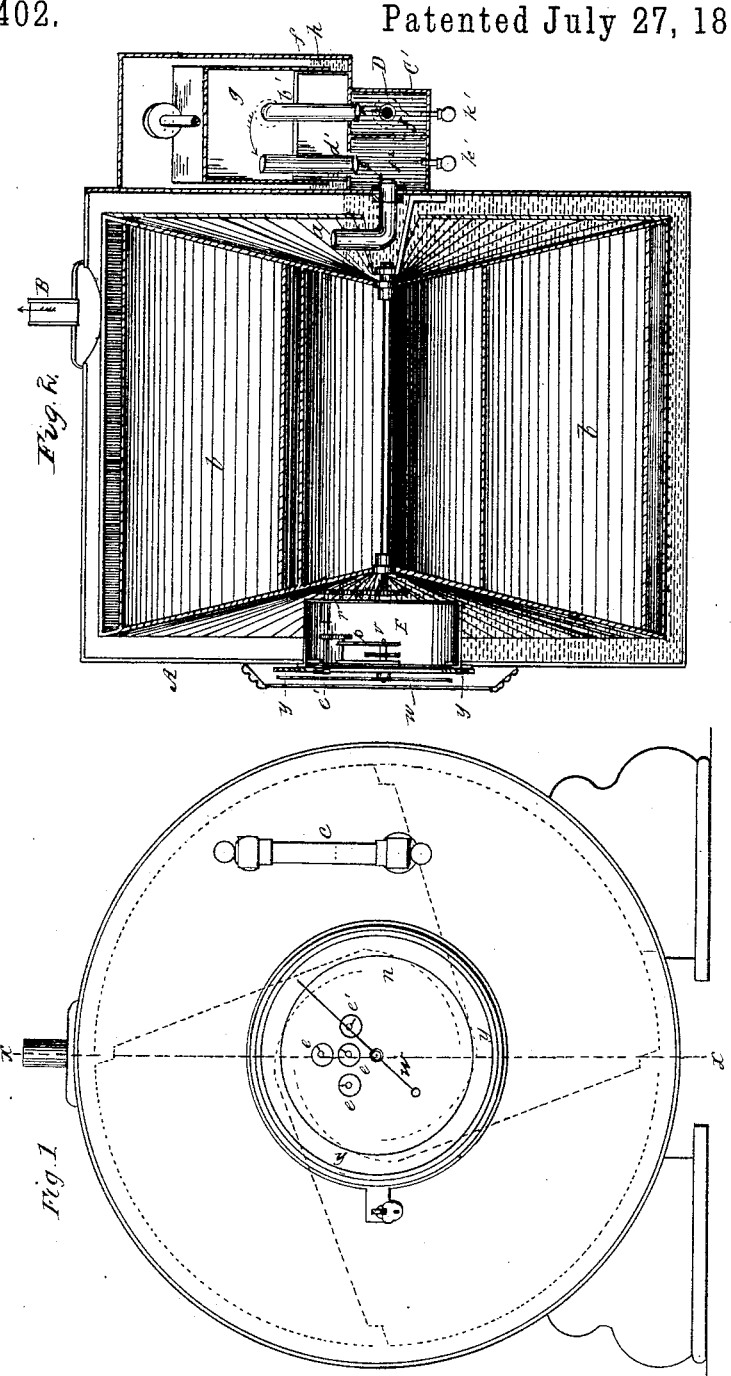
Witnesses:
M. N. Nppilly
Aubrey C. Wilson
Inventor:
James S. DePalos.
By John S. Thornton
Attorney.

(No Model.) 3 Sheets—Sheet 2.
J. S. DE PALOS.
PRICE AND QUANTITY REGISTER FOR GAS METERS.
No. 346,402. Patented July 27, 1886.
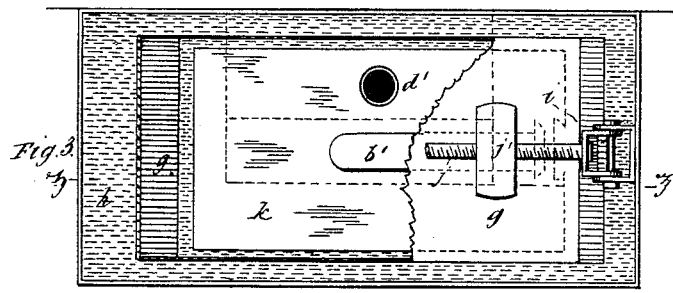
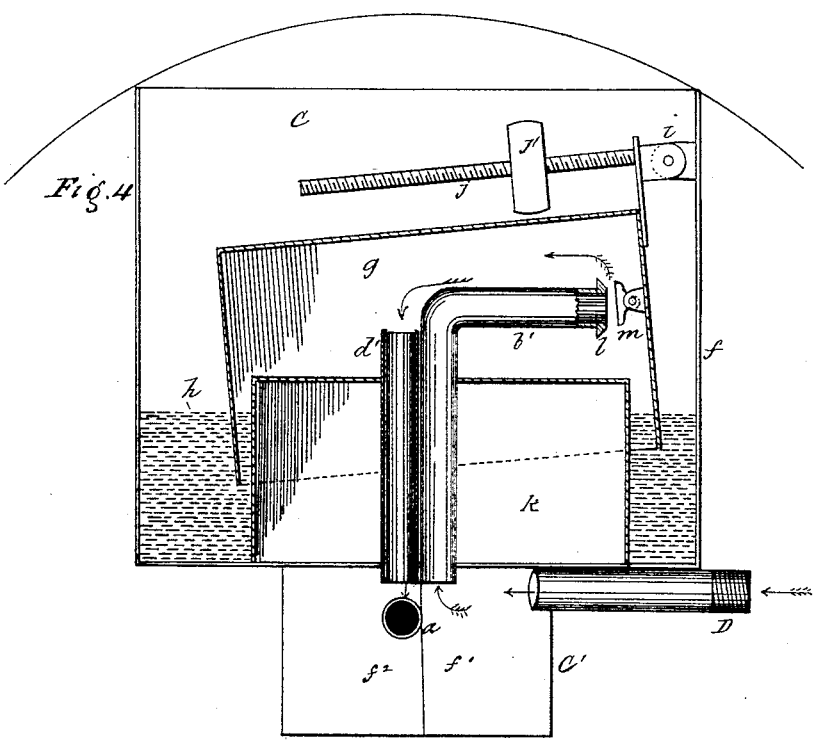
Witnesses:
Inventor:
James S. DePalos.
By John S. Thornton
Attorney (No Model.) 3 Sheets—Sheet 3.
J. S. DE PALOS.
PRICE AND QUANTITY REGISTER FOR GAS METERS.
No. 346,402. Patented July 27, 1886.
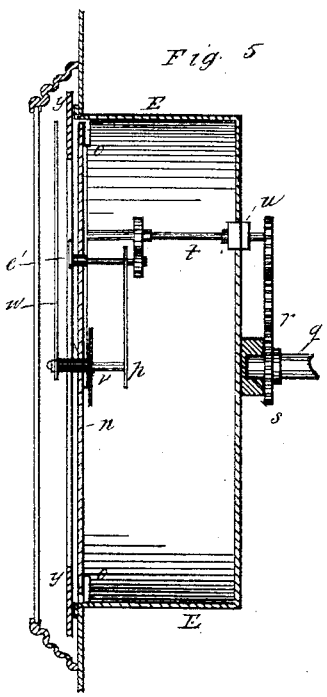
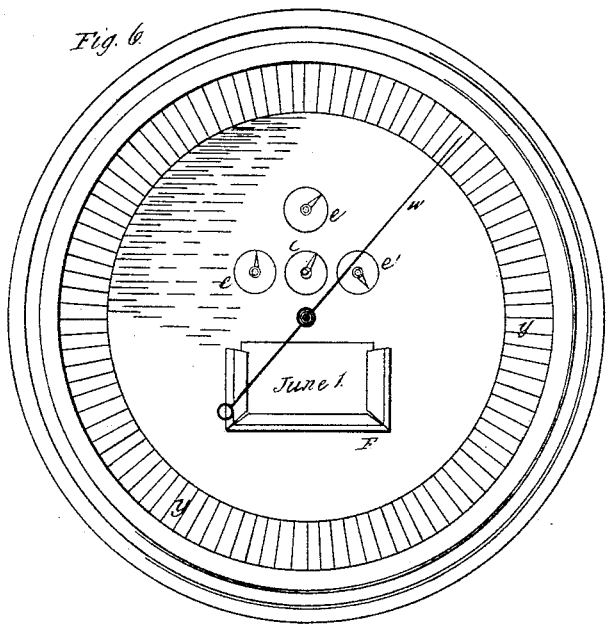
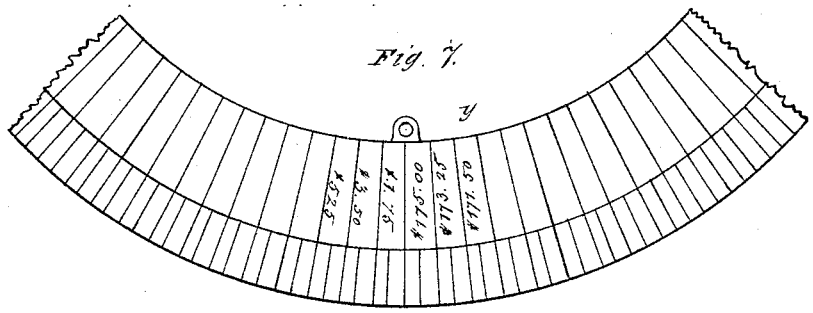
Witnesses:
Inventor:
James S. De Palos
By John S. Thornton
Attorney

UNITED STATES PATENT OFFICE.

JAMES S. DE PALOS, OF NEW YORK, N. Y.

PRICE AND QUANTITY REGISTER FOR GAS-METERS.

SPECIFICATION forming part of Letters Patent No. 346,402, dated July 27, 1886.

Application filed September 17, 1885. Serial No. 177,347. (No model.)

*To all whom it may concern:*

Be it known that I, JAMES S. DE PALOS, a citizen of the United States, residing in the city of New York, in the county and State of New York, have invented certain new and useful Improvements in Gas-Meters; and I hereby declare the following to be a full, clear, and exact description thereof, reference being had to the accompanying drawings on three sheets, which form a part of this specification.

This invention relates to gas-meters; and it consists in certain improvements in the registering devices forming parts thereof, substantially as hereinafter set forth and claimed.

In the accompanying drawings, on Sheet No. 1, Figure 1 represents a front elevation of a gas-meter, showing part of my improvements. Fig. 2 is a vertical longitudinal section on the line $x$ $x$, showing also a longitudinal section of the governor. Fig. 3, Sheet 2, is a plan view of the governor. Fig. 4, Sheet 2, is a vertical section of the governor, taken on the line $z$ $z$ in Fig. 3. Figs. 5 and 6, Sheet 3, are respectively a front view and a vertical section of the index. Fig. 7 shows a portion of the removable graduated scale. Figs. 3 to 7, inclusive, are drawn on an enlarged scale.

Similar letters of reference indicate like parts in all the several figures.

A represents a gas-meter of the kind known as a "wet meter," being filled with a sealing-fluid below the level of the gas-inlet $a$, and $b$ is its measuring-drum, which is of ordinary construction.

$c$ is an indicator or gage of the usual form attached to the front of the meter, so as to connect with its interior for the purpose of showing the level of the fluid in the meter. A plug hidden from view by the body of the governor is provided at the rear end of the meter for adding to the sealing-fluid when necessary, so as to keep it at the proper level.

$e$ $e$ $e$ $e'$ are the ordinary indexes for showing the quantity of gas that has passed through the meter.

B is the outlet-pipe which takes the gas from the meter and delivers it to the burners.

C is my improved governor or regulator for moderating the pressure on the gas before the latter enters the meter. This governor is constructed as follow, namely: $f$ is an outer shell or box which is attached to the rear end of the meter, and has provision at or near its top to admit atmospheric air. $g$ is a float, of sheet metal or other suitable material, the four sides and top of which are made air tight, its under side being open and immersed in a sealing-fluid, $h$. This float is hinged at one of its upper edges to the shell $f$, as shown by $i$, and attached to said hinge $i$ is a screw-threaded rod, $j$, upon which is fitted a weight, $j'$, to move back and forth upon the same. A hollow box or drum, $k$, is secured to the bottom plate of the shell or box $f$, the purpose of which is to take up part of the space occupied by the sealing-fluid, and thereby reduce the quantity of the same.

D is the main inlet-pipe, which takes the gas from the mains and supplies it to the governor; and from thence, after it has been moderated to the proper pressure, it is conducted to the meter by the pipe $a$. This pipe D is passed into and terminates in one compartment, $f'$, of a box, C', attached to the under side of the shell $f$, to receive the incoming gas, and a pipe, $b'$, enters said compartment through its top cover and through the bottom of the shell $f$. At the upper end of this pipe $b'$, which passes through the box $k$, is a valve-seat, $l$, which forms the seat of a valve-plate, $m$, which latter is hinged, as shown, to the inside of the float $g$, in such position that the valve is closed by the rising of the float and opened by it descent, thereby diminishing the quantity admitted when the pressure increases and increasing the quantity admitted when the pressure diminishes. After having passed through the valve $l$ $m$ the gas is conducted downward through a pipe, $d'$, into a separate compartment, $f^2$, of the box C', and from thence into the inlet-pipe $a$. It is immaterial whether the box C' is divided by a transverse or a longitudinal partition, so long as the two compartments $f'$ $f^2$ are separate and effectually isolated from each other. The pressure at which it is desired that the gas shall enter the meter is regulated at pleasure by moving the weight $j'$ toward the end of the rod $j$ to increase the same, and moving it toward the hinge $i$ to reduce the pressure. By these means the gas is regulated to the desired pressure before it enters the meter, and the difficulties heretofore encountered in the use of a wet meter under high street-pressures are entirely removed.

Drip-cups, represented by $k'\,k'$, are provided for the removal of any condensation-fluids.

Referring to Figs. 2 and 5, E is a cylindrical case having its rear end closed, which is fitted or attached to the front end of the meter, concentric therewith, and forms a cylindrical recess. Over the opening of this recess is fitted a circular plate or disk, $n$, which is kept in place by being fastened by screw-nails or similar means to lugs $o$ on the plate E. To the rear side of this disk $n$ is attached a train of gearing, $p$, for giving the proper motion or speed to the ordinary indexes $e\,e\,e\,e'$, whose shafts pass through said disk. The full train of gearing is not shown in the drawings, and will of course vary with the number of indexes used. Motion is imparted to this train of gearing by the meter-shaft $q$, through the medium of gear wheels $r$, connected therewith. The end of the meter-shaft has bearings in any suitable support, $s$, attached to the rear side of the plate E, and a shaft, $t$, passes through a stuffing-box, $u$, and through the rear end of the plate E, and connects with the train of gearing $p$. Positive motion is thereby imparted to the shaft of the one-thousand-feet index $e'$, the latter being geared to rotate at the proper speed as compared to the capacity of the measuring-drum $b$. Connected with the said gearing $p$ and driven by a wheel on the shaft of the one-thousand-feet index is a shaft, $v$, upon the end of which, outside the disk $n$, is fitted an index, $w$, which operates in connection with a circular plate, $y$, graduated to dollars and cents or other monetary notation, to indicate the money value of the gas used. This plate $y$ is made removable, being attached to the disk $n$ by screws, so that it may be removed and replaced by another differently graduated for a different price per one thousand feet of gas, whenever the price is changed.

The operation is as follows: The capacity of the measuring-drum being known, the one thousand-feet index is geared to make the proper speed in comparison therewith. In the drawings the price or rate is indicated as being one dollar and seventy-five cents per one thousand feet, and the index $w$ is geared to make one revolution to every one hundred revolutions of the one-thousand-feet index. Consequently, if at any particular day the index $w$ is set at zero, thereafter as the gas is used it will travel over the space on the graduated scale or plate $y$, indicating $1.75 with every one thousand feet of gas passed through the meter, and thus indicate the money value of the gas used without further calculation or reference to any former record. A small frame, F, is attached to the plate or disk $n$, to receive a card having such date marked thereon, and any alteration or change in the price only requires the substitution of a plate, $y$, graduated in accordance therewith for the one in use without any change whatever in the gearing.

Both the dial-plate $n$ and the regulator C are kept under lock and key, so as to prevent their being tampered with.

The indicator above described can be used on a dry meter without making any material change in its construction.

The devices for regulating the pressure of gas supplied to the meter will form the subject of another application.

What I claim as my invention is—

1. The removable plate $y$, graduated for dollars and cents, in combination with the dial-plate $n$, meter-shaft, a train of gearing operated by said shaft, and an index turned by said gearing and traveling over said plates $n$ and $y$, substantially as set forth.

2. A case provided with frame F, for receiving date-cards, in combination with removable plate $y$, graduated for value, plate $n$, graduated for quantity, the meter-shaft $q$, a set of gearing operated thereby, and an index carried by said gearing over said plates, substantially as set forth.

3. In combination with an ordinary meter-register and its actuating-train, the supplemental ring, changeable as described, bearing price indications, and the hand movable over the same, actuated by the same train and adapted to be reset to zero at will, whereby the consumer can at all times read the cubic measurement of gas consumed and the cost thereof, substantially as set forth.

JAMES S. DE PALOS.

Witnesses:
M. H. UPPING,
JOHN S. THORNTON.